(12) United States Patent
Cusi

(10) Patent No.: US 9,073,524 B2
(45) Date of Patent: Jul. 7, 2015

(54) BRAKING SYSTEM AND METHOD FOR A TOWED VEHICLE

(75) Inventor: Diego Cusi, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 13/327,341

(22) Filed: Dec. 15, 2011

(65) Prior Publication Data

US 2013/0158826 A1    Jun. 20, 2013

(51) Int. Cl.
| | | |
|---|---|---|
| *G06F 7/70* | (2006.01) | |
| *G06F 19/00* | (2011.01) | |
| *G06G 7/00* | (2006.01) | |
| *G06G 7/76* | (2006.01) | |
| *B60T 8/17* | (2006.01) | |

(52) U.S. Cl.
CPC ........... *B60T 8/1708* (2013.01); *B60T 2201/03* (2013.01); *B60T 2230/06* (2013.01)

(58) Field of Classification Search
USPC .......................................... 701/70, 71, 78, 83
See application file for complete search history.

(56) References Cited

U.S. PATENT DOCUMENTS

| | | | |
|---|---|---|---|
| 6,280,004 B1 * | 8/2001 | Greaves, Jr. ..................... 303/20 |
| 2002/0128764 A1 * | 9/2002 | Hecker et al. .................. 701/70 |
| 2002/0163249 A1 * | 11/2002 | Palmer et al. .................. 303/152 |
| 2005/0011693 A1 * | 1/2005 | Horn et al. ..................... 180/282 |
| 2007/0102996 A1 * | 5/2007 | Kelly et al. ....................... 303/3 |
| 2007/0256878 A1 | 11/2007 | Tandy, Jr. et al. |
| 2007/0260387 A1 | 11/2007 | Tandy, Jr. et al. |
| 2010/0152920 A1 * | 6/2010 | McCann .......................... 701/2 |

FOREIGN PATENT DOCUMENTS

| | | |
|---|---|---|
| DE | 4136571 | 3/1993 |
| GB | 2445649 | 7/2008 |

OTHER PUBLICATIONS

International Search Report and Written Opinion for Application No. PCT/US2012/069384 dated Mar. 21, 2013 (9 pages).

* cited by examiner

*Primary Examiner* — Imran Mustafa
(74) *Attorney, Agent, or Firm* — Michel Best Friedrich LLP

(57) ABSTRACT

A braking assistance system for a vehicle towed by a towing vehicle. The braking assistance system includes at least one sensor configured to be coupled to the towed vehicle and to detect information about at the towed vehicle and the towing vehicle, and an electronic control unit having a processor. The electronic control unit is in electronic communication with the sensor to receive information about the towed vehicle and the towing vehicle. The processor is configured to determine an electrical connection between the towing vehicle and the towed vehicle, determine a deceleration of the towed vehicle and the towing vehicle based on the information from the at least one sensor, identify a brake assist situation, and initiate a brake control operation to control braking of the towed vehicle during the brake assist situation.

9 Claims, 4 Drawing Sheets

BRAKING SYSTEM AND METHOD FOR A TOWED VEHICLE

BACKGROUND

The present invention relates to vehicle towing systems. More specifically, the invention relates to braking systems for towed vehicles.

SUMMARY

Very often, vehicles are towed or moved by towing vehicles (e.g., a recreation vehicle or RV towing a small passenger vehicle or automobile). The vehicle being towed can sway back and forth for many different reasons and this sway can create stability problems for the towing vehicle. In many situations, the towed vehicle is braked solely by using the braking system of the towing vehicle. In other words, the brakes of the towing vehicle slow or stop the towing vehicle. The towed vehicle, as a consequence of being mechanically linked to the towing vehicle, is slowed or stopped. However, in many countries there is a legal requirement that the towed vehicle include independents means for braking. Standard devices used for slowing down the towed vehicle include the "brake buddy" or other similar mechanical systems. Although these technologies provide means for stopping the towed vehicle, they require additional installation and, in some situations, are still not sufficient to assist during braking and stopping of the towed vehicles.

In one embodiment, the invention provides a braking assistance system for a vehicle towed by a towing vehicle. The braking assistance system includes at least one sensor configured to be coupled to the towed vehicle and to detect information about the towed vehicle and the towing vehicle, and an electronic control unit having a processor. The electronic control unit is in electronic communication with the sensor to receive information about the towed vehicle and the towing vehicle. The processor is configured (such as by executing certain instructions stored on a computer readable medium) to determine an electrical connection between the towing vehicle and the towed vehicle, determine a deceleration of the towed vehicle and the towing vehicle based on the information from the at least one sensor, identify a brake assist situation, and initiate a brake control operation to control braking of the towed vehicle during the brake assist situation.

In another embodiment, the invention provides a method, at least a part of which may be implemented with a computer, of providing braking assistance of a vehicle towed by a towing vehicle. The method includes detecting, by at least one sensor coupled to the towed vehicle, information about the towed vehicle and the towing vehicle, and connecting an electronic control unit having a processor with the sensor. The processor receives, at the electronic control unit, information from the sensor about the towed vehicle and the towing vehicle. The method further includes operating the processor of the electronic control unit to determine an electrical connection between the towing vehicle and the towed vehicle, determine a deceleration of the towed vehicle and the towing vehicle based on the information from the at least one sensor, identify a brake assist situation, and initiate a brake control operation to control braking of the towed vehicle during the brake assist situation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In addition, it should be understood that embodiments of the invention may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, the electronic based aspects of the invention may be implemented in software (e.g., stored on non-transitory computer-readable medium). As such, it should be noted that a plurality of hardware and software based devices, as well as a plurality of different structural components may be utilized to implement the invention.

Figure 1:
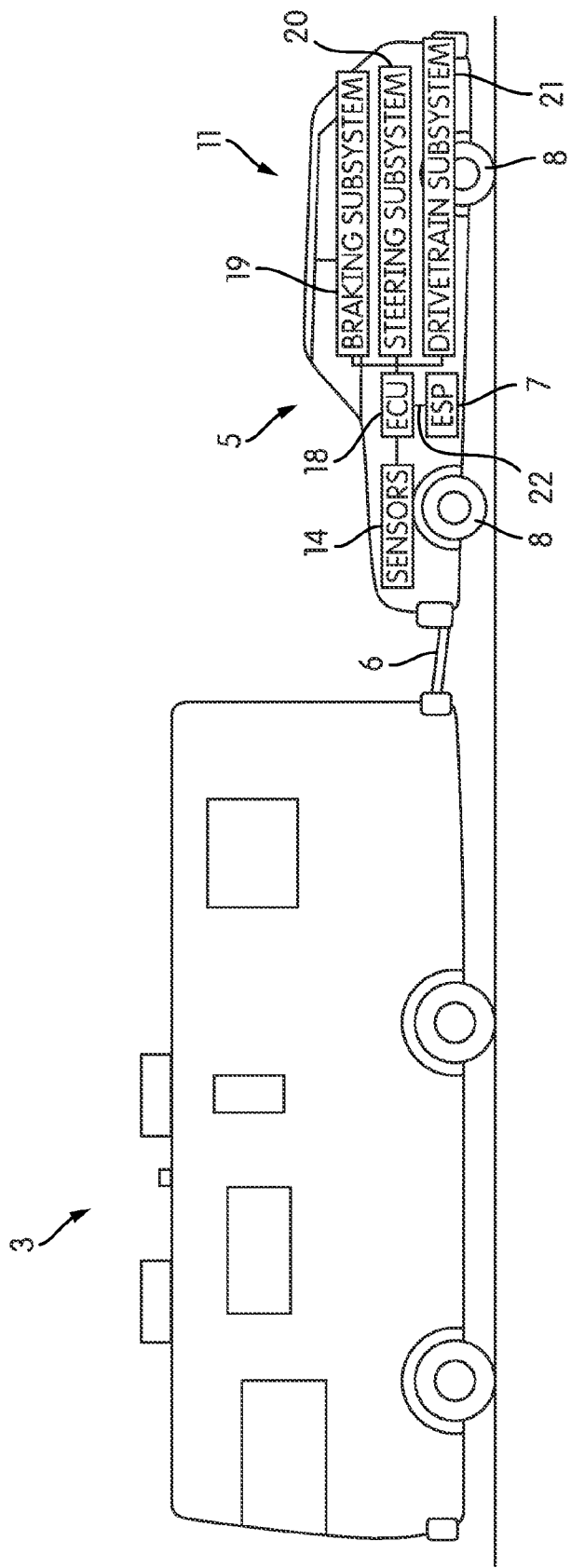
FIG. 1 is a side, elevation view of a towing vehicle and a towed vehicle including a braking assistance system.

FIG. 1 illustrates a towing vehicle 3 (e.g., a RV) and a towed vehicle 5 (e.g., a car) having a plurality of wheels 8. In other embodiments, the braking system discussed below can be applied to different types of vehicles. The towing vehicle 3 is coupled to the towed vehicle 5 by a mechanical connection (e.g., a hitch system 6). In one embodiment, the hitch system 6 includes a hitch ball and a ball receiver. Other hitching systems may be used to couple the towing vehicle 3 to the towed vehicle 5. An operator (i.e., a driver) of the towing vehicle 3 operates a throttle and brake, and turns a steering wheel to direct the towing vehicle in a desired direction or to slow down the towing vehicle. In addition, the towing vehicle 3 is connected to the towed vehicle 5 by an electrical connection. In some embodiments, the electrical connection is between the brake light switches of both vehicles. Therefore, when the operator applies the brakes of the towing vehicles 3, the brake lights of the towed vehicle 5 provide a signal indicative of that action.

The towed vehicle 5 includes, among other systems, a vehicle stability control system 7, such as Electronic Stability Program system ("ESP®") created by Bosch, and a braking assistance system 11 used to assist the towed vehicle 5 during braking. In one embodiment of the invention, the braking assistance system 11 is incorporated within the stability control 7. For example and as further explained below, the braking assistance system 11 is implemented in the form of software embedded within the existing stability control system 7. In another embodiment, the braking assistance system 11 is not part of the stability control system 7 and operates independently from the stability control system 7.

The braking assistance system 11 includes one or mores sensors 14, an electronic control unit ("ECU") 18, and a plurality of control subsystems 19-21. The subsystems can include a braking control subsystem 19, a steering control subsystem 20, and a drivetrain control subsystem 21. Additional subsystems include a traction control subsystem, a stability subsystem, and the like (not shown). In one embodiment, an stability control controller of the stability control system 7 is modified with software in accordance with the teachings herein and used as the ECU 18. The braking assistance system 11 monitors the acceleration of the towing vehicle 3 and the towed vehicle 5. The system 11 determines a brake assist situation (e.g., when the towing vehicle 3 is braking and the vehicles 3 and 5 are decelerating), and initiates a brake control operation to control braking of the towed vehicle 5 during the brake assist situation.

The sensors 14 are used to sense current operating conditions of the towed vehicle 5 and the towing vehicle 3 and provide information representative of the same to the ECU 18. The sensors 14 transmit sensor measurement data (e.g., as analog data or digital data). The sensors 14 include, for example, a longitudinal acceleration senor, a speed sensor, a deceleration sensor, a wheel speed sensor, a yaw rate sensor, a steering angle sensor, a brake pressure sensor, or other types of sensing technology configured to monitor the vehicle 5. The sensors 14 can be positioned at different locations of the towed vehicle 5. In embodiments utilizing the stability control system 7, the sensors 14 are the sensors incorporated in that system. If the sensors are equipped with calibration circuitry or a processor, the sensors can internally convert the sensed conditions to a calibrated form. Otherwise, the sensed conditions can be converted into calibrated signals by other external processes (e.g., the ECU 18).

The sensors 14, the stability control system 7, and the ECU 18 are connected to a bus or network, such as a controller area network ("CAN") bus 22. The CAN bus 22 is connected to other vehicle systems (e.g., subsystems 19-21). Although the components are shown connected via a bus or network, other connections (such as direct wired or wireless connections) can be used to connect the sensors 14 to the ECU 18. The ECU 18 includes a data processing module 25 configured to process the information obtained from the sensors 14 while the towed vehicle 5 travels behind the towing vehicle 3.

Figure 2:
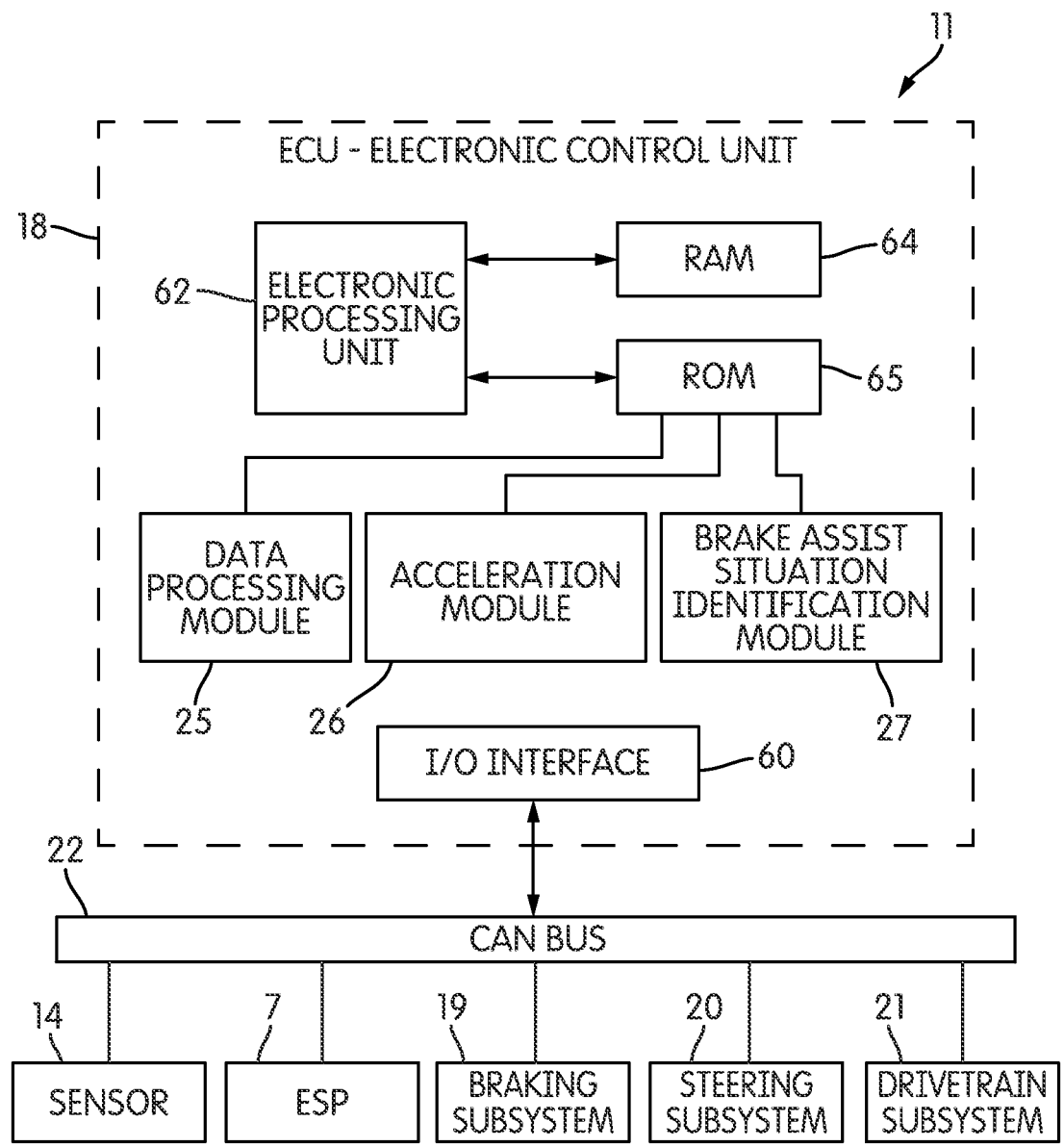
FIG. 2 is a schematic illustration of the braking assistance system of FIG. 1.

FIG. 2 schematically illustrates the braking assistance system 11 in more detail. As shown in FIG. 2, the system 11 includes the ECU 18, the sensors 14, the stability control system 7, and the bus 22. As further discussed below, the ECU 18 can also communicate with other devices or systems through the bus 22. However, the ECU 18 can also obtain information (i.e., data) directly from the sensors 14 rather than over the bus 22. As illustrated in FIG. 2, the ECU 18 of the system 11 is also connected to the braking subsystem 19, the steering subsystem 20, and the drivetrain subsystem 21.

As shown in FIG. 2, the ECU 18 includes an input/output interface 60, an electronic processing unit ("EPU") or a processor 62, and one or more non-transitory memory modules, such as a random access memory ("RAM") 64 and read-only memory ("ROM") 65. The input/output interface 60 transmits and receives data over the bus 22, including data from the sensors 14. It should be understood that the ECU 18 can include multiple processors, additional computer-readable medium modules, multiple I/O interfaces, and/or other additional components or modules (e.g., hardware, software, or a combination thereof).

The input/output interface 60 allows the ECU 18 to communicate with other components inside the towed vehicle 5 (e.g., over the CAN 22) and outside of the towed vehicle 5. In other words, the input/output interface 60 receives data from outside the ECU 18 and outputs information outside the ECU 18. For example, the input/output interface 60 can include a network interface, such as a vehicle-to-vehicle communication device or a wireless network card that allows the system 11 to send and receive information over a network, such as a local area network or the Internet. In some embodiments, the input/output interface 60 is located external to the ECU 18 and may receive data from other devices or systems located in the towed vehicle 5. Similarly, the ECU 18 may be included within another vehicle control system rather than configured as a separate component (e.g., within the stability control system 7). In addition, although not shown in FIG. 2, conditioning circuits or peripheral drivers may be used to interface the ECU 18 with the sensors 14.

In one embodiment, the ECU 18 is configured to communicate with the stability control system 7, the braking subsystem 19, the steering subsystem 20, and the drivetrain subsystem 21. The ECU 18 is configured to receive information from these systems. For example, the ECU 18 receives information about the state of the towed vehicle 5 (e.g., speed, velocity, acceleration/deceleration, yaw rate, and steering angle, etc.) from the stability control system 7 or the subsystems 19-21.

The EPU 62 receives the information from the input/output interface 60 and processes the information by executing one or more instructions or modules (e.g., the data processing module 25, acceleration module 26, brake assist situation identification module 27, etc.). The instructions or modules are stored in non-transitory computer-readable medium, such as ROM 65. The EPU 62 stores and retrieves information (e.g., information received from the bus 22 or information generated by instructions or modules executed by the EPU 62) to and from the RAM 64. The non-transitory computer readable medium 65 includes volatile memory, non-volatile memory, or a combination thereof. The computer-readable medium 65 stores operating system software, applications and/or instructions, data, or combinations thereof. It should be understood that although only a single EPU, RAM, ROM, and input/output interface are illustrated in FIG. 2, the ECU 18 can include multiple processing units, memory modules, and/or input/output interfaces.

The processing EPU 62 executes software instructions that are capable of being stored in the RAM (e.g., during execution), the ROM 65 (e.g., on a generally permanent basis), or another non-transitory computer readable medium such as another memory or a disc. The software includes, for example, firmware, one or more applications, program data, filters, rules, one or more program modules, and other executable instructions. The controller ECU 18 is configured to retrieve from memory and execute, among other things, instructions related to the control processes and methods described herein. In other constructions, the ECU 18 includes additional, fewer, or different components.

Although the ECU 18 is illustrated in FIGS. 1-2 as a separate component from the sensors 14, in some embodiments the ECU 18 is included in the sensors 14. In other embodiments, the ECU 18 is separate from the sensors 14 to prevent faults (e.g., electrical, mechanical, or software-based) in the sensors 14 from affecting the functionality provided by the ECU 18. The ECU 18 can also be combined with other vehicle controllers.

The instructions stored in the computer-readable medium provide particular functionality when executed by the EPU 62. The ECU 18 includes hardware and software and these components cooperate to execute the logic of the braking assistance system 11. As shown in FIG. 2, the input/output interface 60 of the ECU 18 receives data from the sensors 14 and provides the data to the processor 62 of the ECU 18. In some embodiments, the input/output interface 60 processes the data from the sensor 14 before providing the data to the processor 62 of the ECU 18. As described in more detail below with respect to FIGS. 3 and 4, the processor 62 processes the received data and determines a brake assist situation. The processor 62 initiates a brake control operation to control braking of the towed vehicle 5. During the brake control operation, the processor 62 generates control signals to at least one of the subsystems 19-21 to, for example, slow the towed vehicle 5 by using its own braking system 19.

A brake assist situation is identified as a situation where the system 11 has detected, by using the information form the sensors 14, that the brakes on the towing vehicle 3 have been applied. In that situation, the towing vehicle 3 and, consequently, the towed vehicle 5 begin to decelerate. The goal of the braking assistance system 11 is to control the braking of the towed vehicle 5 to assist with slowing down during the detected brake assist situation. When the braking assistance system 11 is integrated within the stability control system 7 or configured to communicate with that system, the stability control system 7 controls the braking assistance system 11. Thus, the stability control system 7 begins brake control operation without the driver's input when the towing vehicle 3 is braking, the vehicles 3 and 5 are decelerating at a predetermined level set by the stability control system 7, and the braking assistance system 11 detects a brake assist situation.

Figure 3:
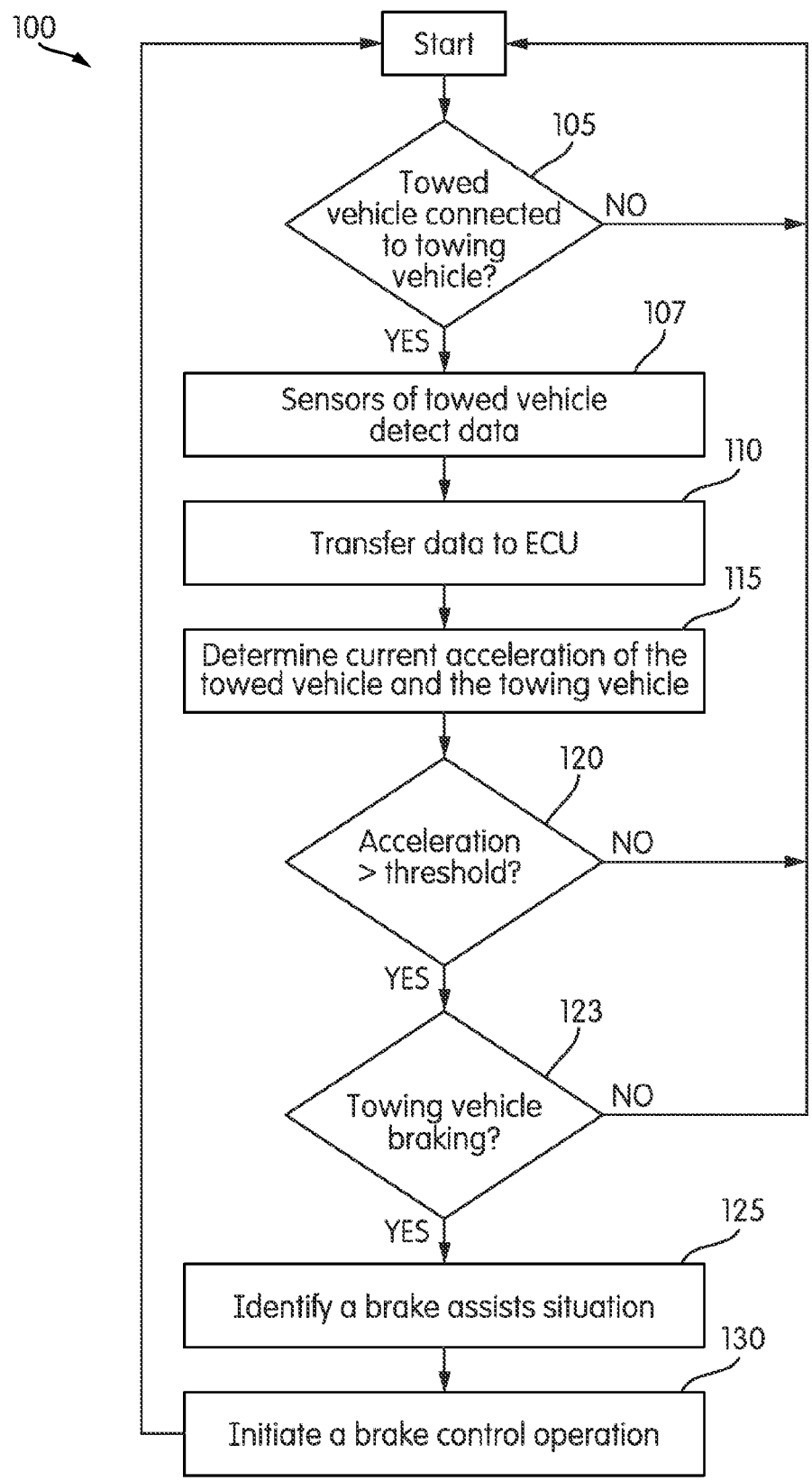
FIG. 3 is a flow chart illustrating a process for brake assistance of a towed vehicle performed by the braking assistance system of FIG. 1.

FIG. 3 illustrates a method 100 of brake assistance for the towed vehicle 5 performed by the ECU 18 according to one embodiment of the invention. For simplicity, one iteration of the logic of FIG. 3 is explained in detail below. In this embodiment, the braking assistance system 11 is operating together with the stability control system 7. However, in other embodiments, the assistance system 11 can operate independently from the stability control system 7. Various steps described herein with respect to the process 100 are capable of being executed simultaneously, in parallel, or in another order that differs from the illustrated serial manner of execution. The process 100 is also capable of being executed using additional or fewer steps than are shown in the illustrated embodiment.

As shown in FIG. 3, the process begins with determining whether the towed vehicle 5 is electrically connected to the towing vehicle 5 (at step 105). For example, this is done by detecting a connection between the brake light switches of both vehicles. If there is no electrical connection between the vehicles, the process 100 returns to its starting point. If, on the other hand, the ECU confirms the existence of an electrical connection signal between the towing vehicle 3 and the towed vehicle 5, the process proceeds to step 105. In other embodiments, the system 11 is configured to determine a brake assist situation and to initiate a brake control operation when the system 11 determines that there is no electrical connection between the vehicles. This feature is designed to prevent situations where the towed vehicle 5 is unintentionally disengaged from the towing vehicle 3 while the vehicles are travelling. That way, the towed vehicle 5 will stop by using its own braking system.

In the next step, the sensors 14 detect information about the current operating conditions of the vehicle 5 (at step 107). Because the towed vehicle 5 is mechanically connected to the towing vehicle 3, the sensors 14 of the vehicle 5 can detect the combined acceleration of both vehicles. The sensors 14 transfer the acquired data to the ECU 18 (at step 110). The data processing module 25 processes the received data and the acceleration module 26 determines the current acceleration or deceleration level of the vehicles 3 and 5 (at step 115). Next, the ECU 18 compares the detected acceleration with a threshold acceleration value (at step 120). The threshold acceleration value can be a predetermined value retrieved from memory or can be dynamically determined by the processor 62 based on the information received from the sensors 14. When the processor determines that the towing vehicle is braking (e.g., by a signal received from the brake light switches) at step 123, and the acceleration of the vehicle 5 (e.g., a negative acceleration or a deceleration) exceeds the threshold acceleration value, the brake assist situation identification module 27 determines that a brake assist situation exists (at step 125).

Next, the processor 62 initiates a brake control operation to control the braking of the towed vehicle 5 during the brake assist situation (at step 130). During the brake control operation, the processor 62 generates command input signals to the braking subsystem 19. The braking subsystem 19 (explained in more detail below) applies brake pressure to the wheels 8 of the vehicle 5 and slows the towed vehicle 5.

Figure 4:
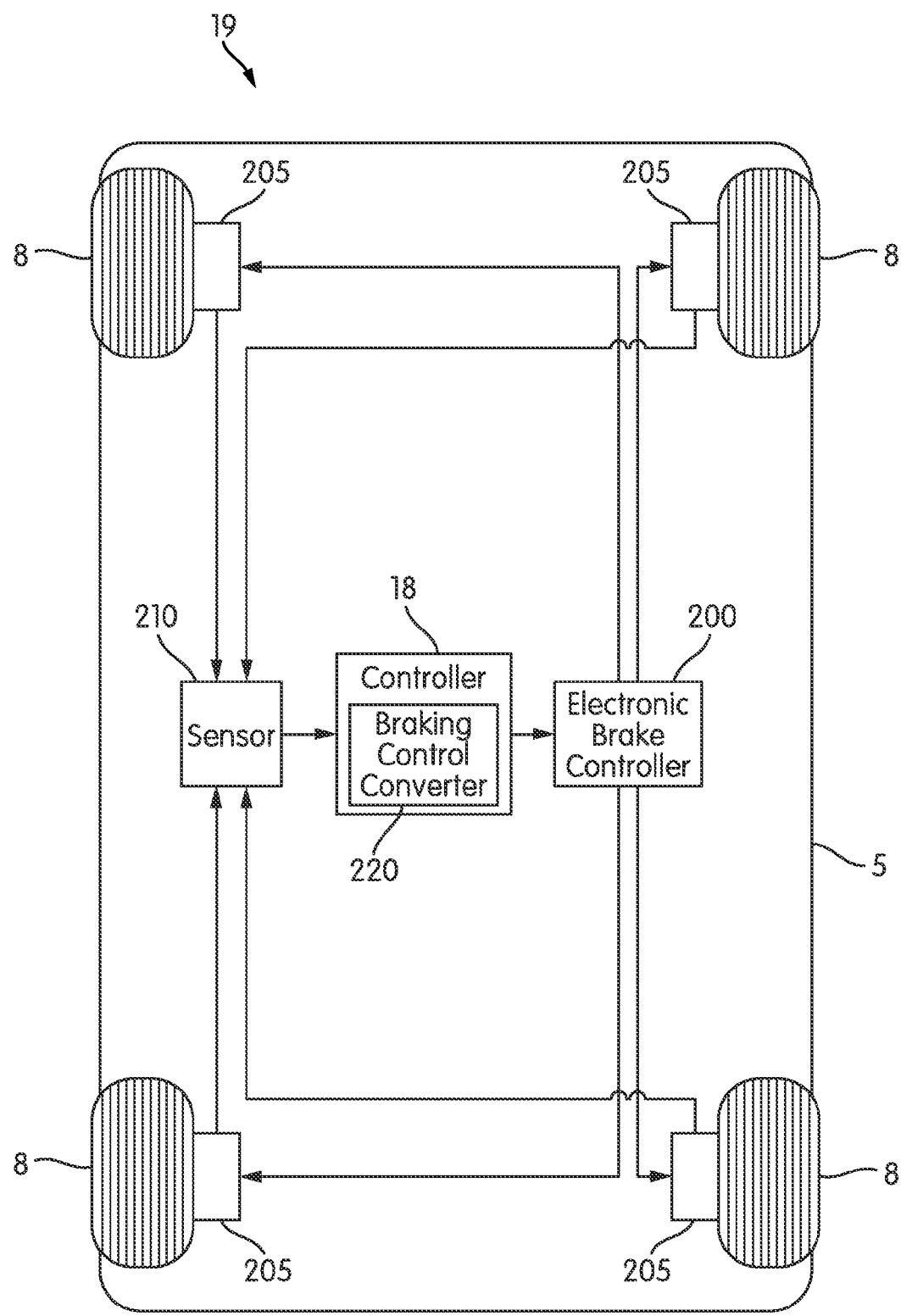
FIG. 4 illustrates a braking control subsystem of the braking assistance system of FIG. 1.

FIG. 4 illustrates the braking control subsystem 19. The braking control subsystem 19 includes an electronic brake controller 200, a plurality of electronically controlled brakes 205, a brake sensor 210, and a braking control converter 220. The brake controller 200 receives a control signal from the ECU 18 to begin a brake control operation. The braking control device 220 receives the command input signals and converts them to braking control signals that are sent to the electronic brake controller 200. The electronic brake controller 200 then generates and sends corresponding brake signals to each of the brakes 205, which actuate valves within the brakes 205 with variable forces. The brake sensor 210 monitors the braking forces that are applied to the wheels 8 by each of the brakes 205. The brake sensor 210 is connected to the ECU 18 such that the braking control device 220 receives the information related to the actual braking forces applied to the wheels 8. The braking control device 220 uses the braking information to modify or maintain the brake control signals that are applied to each brake 205. For example, the front right and rear right brakes can apply a greater braking force than the braking force that is applied (if any) to the left front and left rear brakes. In other embodiments of the invention, different braking control subsystem configurations and components can be used.

What is claimed is:

1. A control system for a vehicle towed by a towing vehicle, the control system comprising:
    at least one sensor mounted in the towed vehicle and configured to detect information about the towed vehicle and the towing vehicle; and
    an electronic stability controller included in the towed vehicle and configured to perform vehicle stability control during non-towing situations of the towed vehicle and to perform brake assistance during towing situations of the towed vehicle, the electronic stability controller configured to perform brake assistance during towing situations of the towed vehicle by,
        determining a deceleration of the towed vehicle and the towing vehicle based on the information from the at least one sensor,
        monitoring a brake signal from a braking system of the towing vehicle,
        initiating a brake control operation to control braking of the towed vehicle when the brake signal indicates that a driver of the towing vehicle has applied the brakes of the towing vehicle and the deceleration exceeds a predetermined threshold, and
        not initiating a brake control operation to control braking of the towed vehicle when the deceleration does not exceed the predetermined threshold.

2. The system of claim 1, wherein the towed vehicle is mechanically connected to the towing vehicle.

3. The system of claim 1, wherein the sensor is a longitudinal acceleration sensor.

4. The system of claim 1, wherein the electronic stability controller is configured to communicate with a braking control system of the towed vehicle.

5. A method for controlling a vehicle, the method comprising:
   detecting, by at least one sensor mounted in the towed vehicle, information about the towed vehicle and the towing vehicle;
   receiving, at an electronic stability controller included in the towed vehicle, information from the sensor about the towed vehicle and the towing vehicle;
   during a non-towing situation, performing vehicle stability control with the electronic stability controller; and
   during a towing situation, performing brake assistance with the electronic stability controller by
      determining a deceleration of the towed vehicle and the towing vehicle based on the information from the at least one sensor,
      monitoring a brake signal from a braking system of the towing vehicle,
      initiating a brake control operation to control braking of the towed vehicle when the brake signal indicates that a driver of the towing vehicle has applied brakes of the towing vehicle and the deceleration exceeds a predetermined threshold, and
      not initiating a brake control operation to control braking of the towed vehicle when the deceleration does not exceed the predetermined threhsold.

6. The method of claim 5, wherein detecting the information about the towed vehicle and the towing vehicle includes detecting the information using a longitudinal acceleration sensor.

7. The method of claim 5, further comprising communicating, by the electronic stability controller, with a braking control system of the towed vehicle.

8. The system of claim 1, wherein the electronic stability controller is further configured to determine an electrical connection between the towing vehicle and the towed vehicle and control braking of the towed vehicle when the electronic stability controller detects that the towed vehicle is electrically disengaged from the towing vehicle.

9. The method of claim 5, further comprising, during a towing situation, determining an electrical connection between the towing vehicle and the towed vehicle and controlling braking of the towed vehicle when the electronic stability controller detects that the towed vehicle is electrically disengaged from the towing vehicle.

* * * * *